United States Patent
Kim et al.

(10) Patent No.: US 9,131,450 B2
(45) Date of Patent: Sep. 8, 2015

(54) METHOD FOR CONTROLLING UPLINK TRANSMISSION POWER FOR TRANSMITTING A PLURALITY OF CODEWORDS IN A WIRELESS COMMUNICATION SYSTEM THAT SUPPORTS A PLURALITY OF ANTENNAS, AND APPARATUS FOR PERFORMING THE METHOD

(75) Inventors: Dongcheol Kim, Gyeonggi-do (KR);
Moonil Lee, Gyeonggi-do (KR);
Hangyu Cho, Gyeonggi-do (KR);
Jaehoon Chung, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 94 days.

(21) Appl. No.: 13/885,734

(22) PCT Filed: Nov. 16, 2011

(86) PCT No.: PCT/KR2011/008764
§ 371 (c)(1),
(2), (4) Date: May 16, 2013

(87) PCT Pub. No.: WO2012/067429
PCT Pub. Date: May 24, 2012

(65) Prior Publication Data
US 2013/0235838 A1  Sep. 12, 2013

Related U.S. Application Data

(60) Provisional application No. 61/413,989, filed on Nov. 16, 2010.

(51) Int. Cl.
*H04W 52/14* (2009.01)
*H04W 52/32* (2009.01)
(Continued)

(52) U.S. Cl.
CPC .......... *H04W 52/146* (2013.01); *H04W 52/325* (2013.01); *H04W 52/34* (2013.01); *H04W 52/343* (2013.01); *H04W 52/346* (2013.01); *H04B 1/707* (2013.01)

(58) Field of Classification Search
None
See application file for complete search history.

(56) References Cited

U.S. PATENT DOCUMENTS

2010/0029320 A1  2/2010 Malladi et al.
2010/0246463 A1*  9/2010 Papasakellariou et al. ... 370/311
(Continued)

FOREIGN PATENT DOCUMENTS

| KR | 10-2009-0083449 A | 8/2009 |
|---|---|---|
| KR | 10-2009-0091121 A | 8/2009 |
| KR | 10-2010-0101541 A | 9/2010 |
| WO | 2008/042187 A2 | 4/2008 |

OTHER PUBLICATIONS

Author Unknown, Power Control for Multi-Codeword Transmission in Rel-10, Submission to 3GPP TSG-RAN WG1 #63, Nov. 10, 2010, pp. 1-5.*

(Continued)

*Primary Examiner* — Christopher Crutchfield
(74) *Attorney, Agent, or Firm* — Morgan, Lewis & Bockius LLP

(57) ABSTRACT

Disclosed are a method for controlling uplink transmission power for transmitting a plurality of codewords in a wireless communication system that supports a plurality of antennas, and a terminal apparatus for the method. The terminal apparatus for controlling uplink transmission power for transmitting a plurality of codewords in a wireless communication system that supports a plurality of antennas comprises a receiver for receiving, from a base station, a first transmission power control parameter including a first transmission power control indication value related to the uplink transmission power control; and a processor for determining uplink transmission power for transmitting said plurality of codewords based on the amount of information for each unit resource for each code word, if said first transmission power control indication value is not zero, wherein said first transmission power control indication value may be a value corresponding to each codeword.

8 Claims, 5 Drawing Sheets

(51) Int. Cl.
*H04W 52/34* (2009.01)
*H04B 1/707* (2011.01)

(56) References Cited

U.S. PATENT DOCUMENTS

| | | | |
|---|---|---|---|
| 2010/0246705 A1* | 9/2010 | Shin et al. | 375/267 |
| 2011/0081935 A1* | 4/2011 | Yeon et al. | 455/522 |
| 2011/0085483 A1* | 4/2011 | Yeon et al. | 370/311 |
| 2011/0207415 A1* | 8/2011 | Luo et al. | 455/68 |
| 2012/0008707 A1 | 1/2012 | Kim et al. | |

OTHER PUBLICATIONS

Author Unknown, R1-103646, Power Control for UL SU-MIMO, Submission to 3GPP TSG-RAN WG1 #61bis, Jul. 2, 2010, pp. 1-5.*
Author Unknown, R1-080881, Range and representation of delta_MCS, Submission to 3GPP TSG-RAN WG1, Feb. 15, 2008, p. 1.*
Search Report issued in corresponding International Patent Application No. PCT/KR2011/008764 dated May 29, 2012.
Written Opinion issued in corresponding International Patent Application No. PCT/KR2011/008764 dated May 29, 2012.

* cited by examiner (a)

(b)

METHOD FOR CONTROLLING UPLINK TRANSMISSION POWER FOR TRANSMITTING A PLURALITY OF CODEWORDS IN A WIRELESS COMMUNICATION SYSTEM THAT SUPPORTS A PLURALITY OF ANTENNAS, AND APPARATUS FOR PERFORMING THE METHOD

This is a U.S. National Phase Entry of PCT Application No. PCT/KR2011/008764, filed Nov. 16, 2011, and claims the benefit of U.S. Provisional Application No. 61/413,989 filed Nov. 16, 2010.

TECHNICAL FIELD

The present invention relates to a wireless communication system, and more particularly, to a method for controlling uplink transmit power for transmission of multiple codewords in a wireless communication system supporting multiple antennas and an apparatus for performing the same.

DISCUSSION OF THE RELATED ART

As an example of a mobile communication system to which the present invention is applicable, a 3rd Generation Partnership Project Long Term Evolution (hereinafter, referred to as 'LTE') and LTE-Advanced (hereinafter, referred to as 'LTE-A') communication system is briefly described.

FIG. 1 is a diagram schematically illustrating the network architecture of an E-UMTS as an exemplary mobile communication system.

An Evolved Universal Mobile Telecommunications System (E-UMTS) is an advanced version of a legacy Universal Mobile Telecommunications System (UMTS) and standardization thereof is currently underway in the 3GPP. E-UMTS may be generally referred to as a Long Term Evolution (LTE) system. For details of the technical specifications of UMTS and E-UMTS, reference can respectively be made to Release 8 and Release 9 of "3rd Generation Partnership Project; Technical Specification Group Radio Access Network".

Referring to FIG. 1, E-UMTS includes a User Equipment (UE), Base Stations (BSs), and an Access Gateway (AG) which is located at an end of a network (Evolved-Universal Terrestrial Radio Access Network ((E-UTRAN)) and connected to an external network. The BSs may simultaneously transmit multiple data streams for a broadcast service, a multicast service, and/or a unicast service.

One or more cells may be present per BS. A cell is configured to use one of bandwidths of 1.25, 2.5, 5, 10, 20 MHz to provide a downlink (DL) or uplink (UL) transport service to several UEs. Different cells may be configured to provide different bandwidths. The BS controls data transmission and reception for a plurality of UEs. The BS transmits DL scheduling information with respect to DL data to notify a corresponding UE of data transmission time/frequency domains, coding, data size, and Hybrid Automatic Repeat and reQuest (HARQ)-related information. In addition, the BS transmits UL scheduling information with respect to UL data to inform a corresponding UE of available time/frequency domains, coding, data size, and HARQ-related information. An interface for transmitting user traffic or control traffic may be used between BSs. A Core Network (CN) may include the AG, a network node for user registration of the UE, and the like. The AG manages mobility of the UE on a Tracking Area (TA) basis, wherein one TA consists of a plurality of cells.

Although radio communication technology has been developed up to LTE based on Wideband Code Division Multiple Access (WCDMA), demands and expectations of users and service providers continue to increase. In addition, since other radio access technologies are being developed, new technical evolution is required to secure future competitiveness. Decrease of cost per bit, increase of service availability, flexible use of a frequency band, simple structure, open interface, and suitable UE power consumption are required.

Recently, 3GPP has been establishing a standard task for a subsequent technique of LTE. In this disclosure, such a technique is referred to as 'LTE-A'. One of the main differences between an LTE system and an LTE-A system is system bandwidth and the introduction of a relay node.

The LTE-A system is aimed at supporting broadband up to a maximum of 100 MHz and, to this end, the LTE-A system is designed to use a carrier aggregation or bandwidth aggregation technique achieving broadband using a plurality of frequency blocks.

Carrier aggregation employs a plurality of frequency blocks as one large logical frequency band in order to use a wider frequency band. A bandwidth of each frequency block may be defined based on a bandwidth of a system block used in the LTE system. Each frequency block is transmitted using a component carrier.

In legacy 3GPP LTE Rel-8, the UE has performed a power control operation for a system based on a single antenna, a single layer, or a single codeword. Meanwhile, in a system employing multiple antennas, multiple layers, or multiple codewords, the UE cannot sufficiently support a multi-antenna, multi-layer, or multi-codeword based power control operation by the conventional single antenna based power control operation. However, a detailed study of the multi-antenna, multi-layer, or multi-codeword based power control operation has not been underway.

DISCLOSURE

Technical Problem

An object of the present invention devised to solve the problem lies in a method for controlling, at a user equipment, UL transmit power for transmission of multiple codewords through a plurality of antennas in a wireless communication system.

Another object of the present invention devised to solve the problem lies in a user equipment for controlling UL transmit power for transmission of multiple codewords through a plurality of antennas in a wireless communication system.

It will be appreciated by persons skilled in the art that that the technical objects that can be achieved through the present invention are not limited to what has been particularly described hereinabove and other technical objects of the present invention will be more clearly understood from the following detailed description.

Technical Solution

The object of the present invention can be achieved by providing a method for transmitting a method for controlling an uplink transmission power for transmission of multiple codewords at a user equipment in a wireless communication system supporting multiple antennas, including receiving a first transmission power control parameter including a first transmission power control indication value related to uplink transmission power control from a base station, and determining an uplink transmission power for transmission of the multiple codewords based on the amount of corresponding information per unit resource of each of the multiple codewords if the first transmission power control indication value is not 0, wherein the first transmission power control indication value is a value corresponding to each of the multiple codewords. The determination may further include calculating a second transmission power control parameter related to the amount of corresponding information per unit resource of each of the multiple codewords, wherein the uplink transmission power for transmission of the multiple codewords may be determined using the calculated second transmission power control parameter. The calculated second transmission power control parameter may be the sum or average of transmission power control parameters calculated with respect to each of the multiple codewords. The uplink transmission power for transmission of the multiple codewords may be determined with respect to a Physical Uplink Shared Channel (PUSCH). The first power control parameter may be a parameter 'deltaMCS-Enabled' received through higher-layer signaling.

In another aspect of the present invention, provided herein is a user equipment for controlling an uplink transmission power for transmission of multiple codewords in a wireless communication system supporting multiple antennas, including a receiver for receiving a first transmission power control parameter including a first transmission power control indication value related to uplink transmission power control from a base station, and a processor for determining an uplink transmission power for transmission of the multiple codewords based on the amount of corresponding information per unit resource of each of the multiple codewords if the first transmission power control indication value is not 0, wherein the first transmission power control indication value is a value corresponding to each of the multiple codewords. The processor may calculate a second transmission power control parameter related to the amount of corresponding information per unit resource of each of the multiple codewords and determine the uplink transmission power for transmission of the multiple codewords is determined using the calculated second transmission power control parameter.

Advantageous Effects

According to various UL control equations proposed in the present invention, power control of a UE using multiple antennas, multiple layers, and multiple codewords is easy and simple.

Reception performance of the BS can be improved by signal transmission caused by power control of the UE using multiple antennas, multiple layers, and multiple codewords.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included as a part of the detailed description to provide a further understanding of the invention, provide embodiments of the invention and together with the description serve to explain the principle of the invention. In the drawings.

BEST MODE

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, although the following detailed description is given under the assumption of a 3GPP LTE system as a mobile communication system, it is applicable to other arbitrary mobile communication systems except for matters that are specific to the 3GPP LTE system.

In some instances, known structures and devices are omitted or are shown in block diagram form, focusing on important features of the structures and devices, so as not to obscure the concept of the present invention. The same reference numbers will be used throughout this specification to refer to the same parts.

The following description assumes that a User Equipment (UE) refers to a mobile or fixed user equipment such as a Mobile Station (MS) or an Advanced Mobile Station (AMS) and a Base Station (BS) refers to an arbitrary node of a network stage communicating with a UE, such as a Node B, an eNode B, or Access Point (AP).

In a mobile communication system, a UE may receive information on DL from a BS, and the UE may transmit information on UL. Information transmitted and received by the UE includes data and various control information. A variety of physical channels is present according to types or usages of information transmitted or received by the UE.

Figure 1:
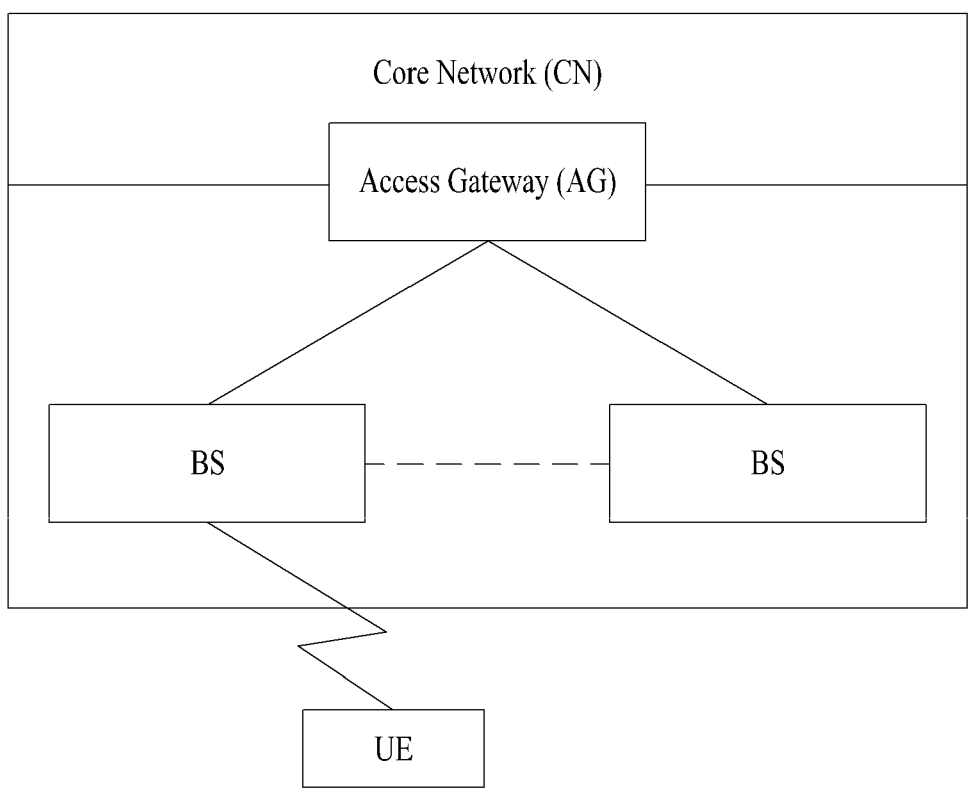
FIG. 1 is a diagram schematically illustrating the network architecture of an E-UMTS as an exemplary mobile communication system.
Figure 2:
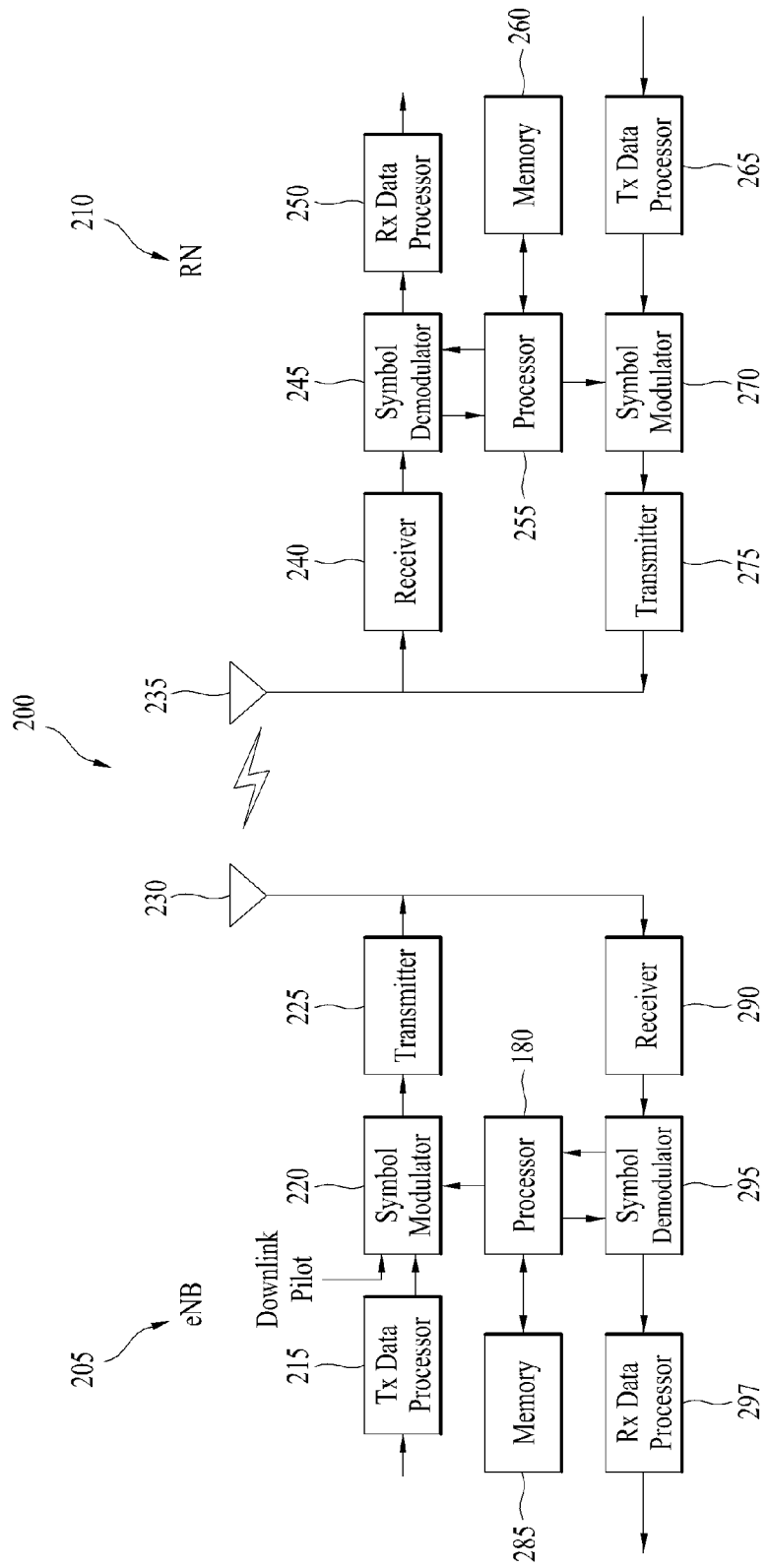
FIG. 2 is a block diagram illustrating the configuration of a BS 205 and a UE 210 in a wireless communication system 200.

FIG. 2 is a block diagram illustrating the configuration of a BS 205 and a UE 210 in a wireless communication system 200.

The wireless communication system 200 depicts one BS 205 and one UE 210 for brevity. However, the wireless communication system 200 may include more than one BS and/or more than one UE.

Referring to FIG. 2, the BS 205 may include a transmission (Tx) data processor 215, a symbol modulator 220, a transmitter 225, a transmission/reception (Tx/Rx) antenna 230, a processor 280, a memory 285, a receiver 290, a symbol demodulator 295, and a reception (Rx) data processor 297. The UE 210 may include a Tx data processor 265, a symbol modulator 270, a transmitter 275, a Tx/Rx antenna 235, a processor 255, a memory 260, a receiver 240, a symbol demodulator 245, and an Rx data processor 250. Although one antenna 230 and one antenna 235 are depicted in the BS 205 and the UE 210, respectively, each of the BS 205 and the UE 210 includes a plurality of antennas. Accordingly, the BS 205 and the UE 210 according to the present invention support a Multiple Input Multiple Output (MIMO) system. The BS 205 according to the present invention may support both a Single User-MIMO (SU-MIMO) scheme and a Multi User-MIMO (MU-MIMO) scheme.

On DL, the Tx data processor 215 receives, formats, codes, interleaves, and modulates (or symbol maps) traffic data and provides modulated symbols ("data symbols"). The symbol modulator 220 receives and processes the data symbols and pilot symbols and provides a stream of symbols.

The symbol modulator 220 multiplexes the data and pilot symbols and transmits the multiplexed symbols to the transmitter 225. Each transmission symbol may be a data symbol, a pilot symbol, or a signal value of zero. Pilot symbols may be sent continuously in each symbol period. The pilot symbols may be Frequency Division Multiplexed (FDM), Orthogonal Frequency Division Multiplexed (OFDM), Time Division Multiplexed (TDM), or Code Division Multiplexed (CDM) symbols.

The transmitter 225 receives and converts the stream of symbols into one or more analog signals and further coordinates (e.g., amplifies, filters, and frequency up-converts) the analog signals to generate DL signals suitable for transmission over a radio channel. The DL signals are then transmitted through the antenna 230 to the UE.

In the configuration of the UE 210, the antenna 235 receives the DL signals from the BS 205 and provides the received signals to the receiver 240. The receiver 240 coordinates (e.g., filters, amplifies, and frequency down-converts) the received signals and digitizes the coordinated signals to obtain samples. The symbol demodulator 245 demodulates received pilot symbols and provides the demodulated pilot symbols to the processor 255 for channel estimation.

The symbol demodulator 245 receives a frequency response estimate for DL from the processor 255, performs data demodulation upon received data symbols to obtain data symbol estimates (which are estimates of transmitted data symbols), and provides the data symbol estimates to the Rx data processor 250. The Rx data processor 250 demodulates (e.g., symbol demaps), deinterleaves, and decodes the data symbol estimates to recover the transmitted traffic data.

Processing by the symbol demodulator 245 and the Rx data processor 250 is complementary to processing by the symbol modulator 220 and the Tx data processor 215, respectively, in the BS 205.

On UL, the Tx data processor 265 of the UE 210 processes traffic data and provides data symbols. The symbol modulator 270 receives and multiplexes the data symbols, performs modulation, and provides a stream of symbols to the transmitter 275. The transmitter 275 then receives and processes the stream of symbols to generate UL signals, which are transmitted through the antenna 235 to the BS 205.

In the BS 205, the UL signals from the UE 210 are received through the antenna 230 and the receiver 290 processes the received UL signals to obtain samples. The symbol demodulator 295 then processes the samples and provides received pilot symbols and data symbol estimates for UL. The Rx data processor 297 processes the data symbol estimates to recover traffic data transmitted from the UE 210.

The processors 255 and 280 of the UE 210 and the BS 205 direct (e.g., control, coordinate, manage, etc.) operation at the UE 210 and the BS 205, respectively. The respective processors 255 and 280 may be connected to the memories 260 and 285 that store program code and data. The memories 260 and 285 are connected to the processor 280 to store operating systems, applications, and general files.

The processors 255 and 280 may be referred to as controllers, microcontrollers, microprocessors, microcomputers, etc. Meanwhile, the processors 255 and 280 may be implemented by hardware, firmware, software, or combinations thereof. When embodiments of the present invention are achieved using hardware, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs), which are configured to perform the present invention, may be included in the processors 255 and 280.

On the other hand, when embodiments of the present invention are implemented using firmware or software, firmware or software may be configured to include a module, a procedure, a function, etc. performing functions or operations of the present invention. The firmware or software configured to perform the present invention may be included in the processors 255 and 280 or stored in the memories 260 and 285 so as to be executed by the processors 255 and 280.

Layers of a radio interface protocol between the UE and the BS and a radio communication system (network) may be divided into a first layer (L1), a second layer (L2), and a third layer (L3), based on the three lower layers of an Open System interconnection (OSI) model widely known in the art of communication systems. A physical layer belongs to the first layer and provides information transfer services through a physical channel. A Radio Resource Control (RRC) layer belongs to the third layer and provides control radio resources between the UE and the network. The UE and the BS may exchange RRC messages with the radio communication network through the RRC layer.

Figure 3:
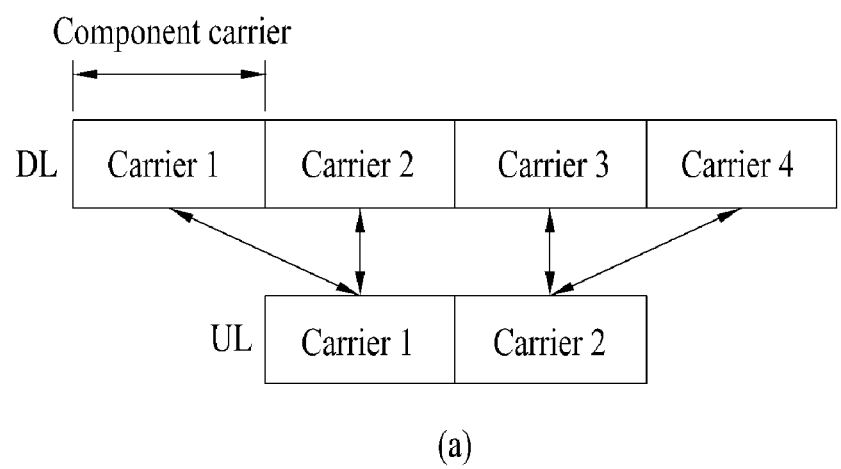
FIG. 3 is a diagram illustrating a Carrier Aggregation (CA) communication system.
Figure 3:
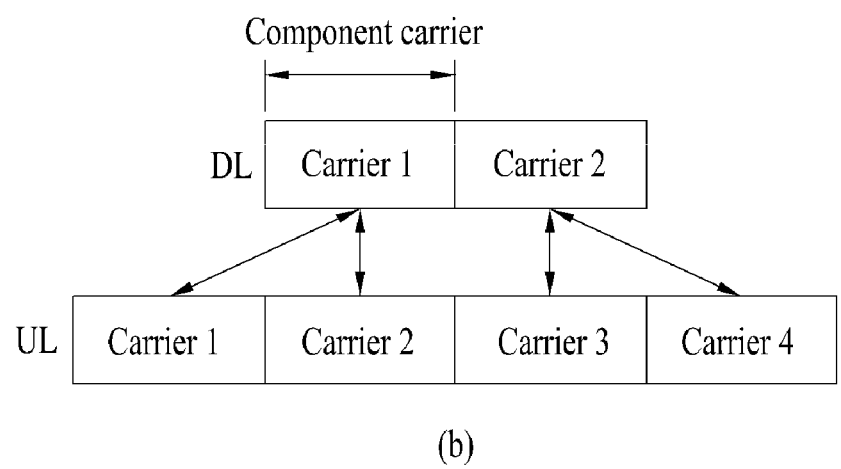

FIG. 3 is a diagram illustrating a Carrier Aggregation (CA) communication system.

An LTE-A system uses a carrier aggregation or bandwidth aggregation technology that uses a wider UL/DL bandwidth by aggregating a plurality of UL/DL frequency blocks in order to employ a wider frequency bandwidth. Each narrow frequency bandwidth is transmitted using a Component Carrier (CC). The CC may be understood as being a carrier frequency (a center carrier or center frequency) for a corresponding frequency block).

CCs may be contiguous or non-contiguous in a frequency domain. Bandwidths of the CCs may be restricted to bandwidths of a legacy system for the purpose of supporting backward compatibility with the legacy system. For example, a legacy 3GPP LTE system may support bandwidths of 1.4, 3, 5, 10, 15, and 20 MHz and the LTE-A system may support bandwidths wider than 20 MHz through combination of the above bandwidths. The bandwidths of the CCs may be independently determined. Asymmetric CA in which the number of UL CCs differs from the number of DL CCs may be used. A DL CC/UL CC link may be fixed to a system or may be semi-statically configured. For example, when 4 DL CCs and 2 UL CCs are present as shown in FIG. 3(a), a DL-UL linkage may be configured such that the ratio of DL CCs to UL CCs is 2:1. Similarly, when 2 DL CCs and 4 UL CCs are present as shown in FIG. 3(b), the DL-UL linkage may be configured to correspond to DL CC:UL=1:2. Unlike the illustrated cases, symmetric CA in which the number of DL CCs is the same as the number of UL CCs may be configured and, in this case, the DL-UL linkage configuration of DL CC:UL CC=1:1 may be used.

Furthermore, even if the entire system bandwidth is configured using N CCs, a frequency bandwidth which can be monitored/received by a specific UE may be limited to M (<N) CCs. Various parameters regarding CA may be configured cell-specifically, UE group-specifically, or UE-specifically. Meanwhile, control information may be configured for transmission and reception only through a specific CC. This specific CC is referred to as a Primary CC (PCC) and the other CCs may be designated as Secondary CCs (SCCs).

LTE-A uses the concept of a cell to manage radio resources. The cell is defined as a combination of DL and UL resources. Here, the UL resource is not an indispensable element. Accordingly, the cell can be comprised of the DL resource alone or of the DL resource and UL resource. When CA is supported, a linkage between a carrier frequency of the DL resource (or DL CC) and a carrier frequency of the UL resource (or UL CC) may be indicated by system information. A cell that operates on a primary frequency (or PCC) may be referred to as a primary cell (Pcell) and a cell that operates on a secondary frequency (or SCC) may be referred to as a secondary cell (SCell).

PCell is used for a UE to perform an initial connection establishment or connection re-establishment procedure. PCell may refer to a cell designated during a handover process. SCell is configurable after Radio Resource Control (RRC) connection establishment and may be used to provide additional radio resources. Both PCell and SCells may be referred to as a serving cell. Accordingly, for a UE, for which CA is not configured or CA is not supported in an RRC_CONNECTED state, a single serving cell comprised of only the PCell is present. Meanwhile, for a UE, for which CA is configured in the RRC_CONNECTED state, one or more serving cells including the PCell and SCells are present. For CA, a network may configure one or more SCells for a UE that supports CA in addition to an initially configured PCell in a connection establishment procedure after an initial security activation procedure is initiated.

As opposed to the legacy LTE system using one carrier, a method for effectively managing CCs is needed in CA using a plurality of CCs. To effectively manage CCs, the CCs may be classified according to the role or characteristics thereof. In CA, multiple carriers may be classified into a PCC and SCCs, which may be UE-specific parameters.

The PCC is a centered CC for management of CCs when multiple CCs are used and one PCC per UE is defined. The PCC may serve as a core carrier for managing all aggregated CCs and the other SCCs may function to provide additional frequency resources for offering a high transfer rate. For example, RRC for signaling between a BS and a UE may be configured through the PCC. Information for security and higher layers may also be provided through the PCC. Actually, when only a single CC is present, the CC will serve as the PCC and, in this case, the PCC may perform same role as a carrier of the legacy LTE system.

The BS is assigned an Activated Component Carrier (ACC) which is activated for the UE among a plurality of CCs. The UE recognizes an ACC allocated thereto in advance through signaling. The UE may gather responses to a plurality of PDCCHs received from a DL PCell and DL SCells and may transmit the responses over a PUCCH through a UL PCell.

Hereinafter, a power control operation will be described. Conventionally, a UE performs a system power control operation based on a single antenna, a single layer, or a single codeword. However, in a system using multiple antennas, multiple layers, or multiple codewords, the UE cannot sufficiently support a multi-antenna, multi-layer, or multi-codeword based power control operation using the conventional single-antenna based power control operation. Accordingly, the present invention proposes parameters and operations necessary for UE power control based on multiple antennas.

Since a 3GPP Release-10 system supports two codewords, four layers, and four Tx antennas, the concept of Tx powers for respective codewords, Tx powers for respective layers, and Tx powers for respective Tx antennas has been introduced. The Tx powers for the respective codewords may be the same or different. The Tx powers for the respective codewords are different because different Modulation and Coding Scheme (MCS) levels are applied to the respective codewords. The maximum powers for the respective antennas (antenna ports) may be the same or different and maximum powers for antenna groups may be the same or different.

In a system that handles multiple carriers, the processor 250 of the UE needs to perform UL power control per CC index, per codeword index, and per antenna port index.

Figure 4:
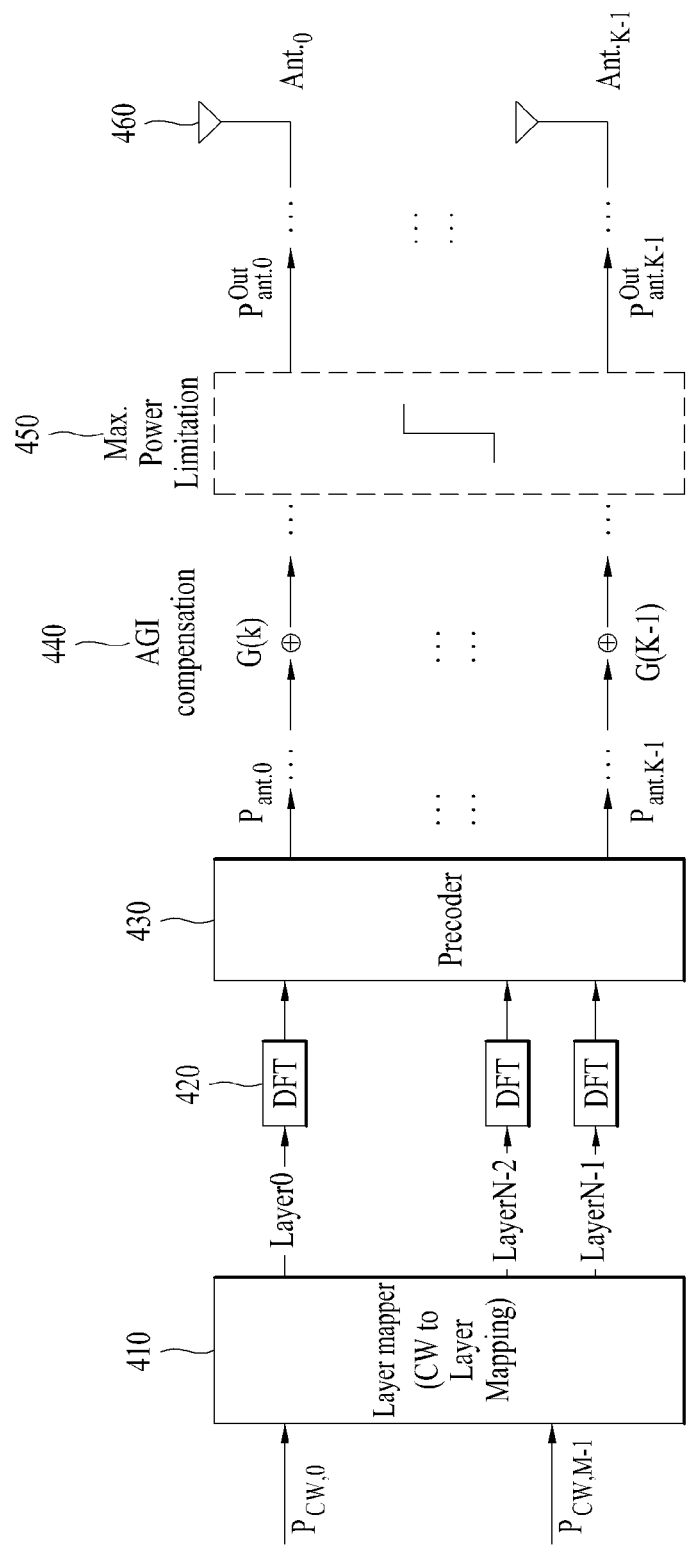
FIG. 4 is a diagram illustrating an example of a UL MIMO transmission chain of a 3GPP Release-10 system as an exemplary wireless communication system.

FIG. 4 is a diagram illustrating an example of a UL MIMO transmission chain of a 3GPP Release-10 system as an exemplary wireless communication system.

Referring to FIG. 4, UL MIMO transmission of the Release-10 system illustrates powers at reference points. In FIG. 4, M codewords are present for a UE and a power for the m-th codeword is expressed as $P_{cw,m}$. In addition, it is assumed that there are N layers and K Tx antennas for the UE. For notational convenience, the power of the k-th antenna after precoding by a precoder 430 is denoted by as $P_{ant,k-1}$ and the radiated power of the k-th antenna is denoted by $P_{ant,k-1}^{out}$. If Antenna Gain Imbalance (AGI) compensation and maximum power restriction are not applied, then $P_{ant,k-1}^{out}$ is equal to $P_{ant,k-1}$.

A layer mapper 410 maps M input codewords $P_{cw,0}, \ldots, P_{cw,m-1}$ to layers. The mapped codewords are Fourier transformed through a Discrete Fourier Transform (DFT) module 420 and then are input to the precoder 430. The precoder 430 precodes the codewords. The powers of the respective antennas after precoding by the precoder 430 may be expressed as $P_{ant,0}, P_{ant,1}, \ldots, P_{ant,K-1}$.

An AGI compensation module 440 performs AGI compensation on $P_{ant,0}, P_{ant,1}, \ldots, P_{ant,K-1}$ which are the powers of the antennas after precoding by the precoder 430. The AGI compensation module 440 performs Tx power compensation to eliminate imbalance between the antennas through hand clipping etc. An AGI compensation value may be predefined or the BS may inform the UE of the AGI compensation value. A maximum power control module 450 restricts the AGI compensated powers of the antennas to powers within the range of a maximum power. For example, the maximum power control module 450 may restrict the Tx power of each antenna to a power within 23 dBm. The Tx powers of the antennas after operation of the maximum power control module 450 are denoted by $P_{ant,0}^{out}, P_{ant,1}^{out}, \ldots, P_{ant,k-1}^{out}$. The respective antennas $Ant_0, Ant_1, \ldots, Ant_{K-1}$ transmit signals with the Tx powers of $P_{ant,0}^{out}, P_{ant,1}^{out}, \ldots, P_{ant,k-1}^{out}$.

Generally, signals should most preferably be transmitted at the same Tx powers for the antennas $Ant_0, Ant_1, \ldots, Ant_{K-1}$ in order to improve the reception performance of the BS.

Hereinafter, power control per codeword will be described. For example, when transmission of two codewords is considered, a codeword-specific differentiated parameter may be $\Delta_{TF}$ and this parameter relates to a scheduled MCS of each codeword. A different $\Delta_{TF}$ for each codeword results in a different Tx power per codeword and a different Tx power per antenna, which may require complicated power adaptation functionality per antenna. Therefore, an alternative to this problem is to allow only a different MCS per codeword but with the same power since the performance gap between power/MCS adaptation and MCS-only adaptation is insignificant.

As an example, for transmission of two codewords, the respective codewords may use the same Tx power. In this case, power control per codeword may not be necessary. In the case where a different MCS per codeword is allowed, if MCSs of the two codewords are different, Ks may be set to 0.

Whether AGI compensation and per-antenna power control are necessary or not has been discussed. Water-pouring or unequal power weighting on different Power Amplifiers (PAs) provides marginal gains, which does not justify additional DL signaling overhead for TPC commands for multiple antennas. Per-antenna power control may cause complexity in terms of a Power Headroom Report (PHR), scheduling/resource allocation, and maximum power limitation scaling. Per-antenna power control is detrimental to UE battery life. A UL single antenna port mode may provide better transmission efficiency than a multiple antenna port mode to which AGI is applied.

AGI compensation does not provide sufficient gain and has a negative effect on UE battery life. Accordingly, a Transmitted Precoding Matrix Indicator (TPMI) or switching to a UL single antenna mode can sufficiently compensate AGI without per-antenna power control.

Maximum power limitation per carrier needs to be applied prior to the total Tx power limitation of the UE. In the case of multiple UL Tx antennas, it is an issue whether the maximum power limitation per carrier is sufficient or maximum power limitation per antenna should be newly introduced. This issue depends upon the necessity of per-codeword power control and/or per-antenna power control. From a technical perspective, maximum power limitation per antenna may be unnecessary because the Tx powers at multiple antennas are the same. If neither per-codeword power control nor per-antenna power control is adopted, maximum power limitation per carrier may be sufficient and power limitation per antenna may be unnecessary.

Figure 5:
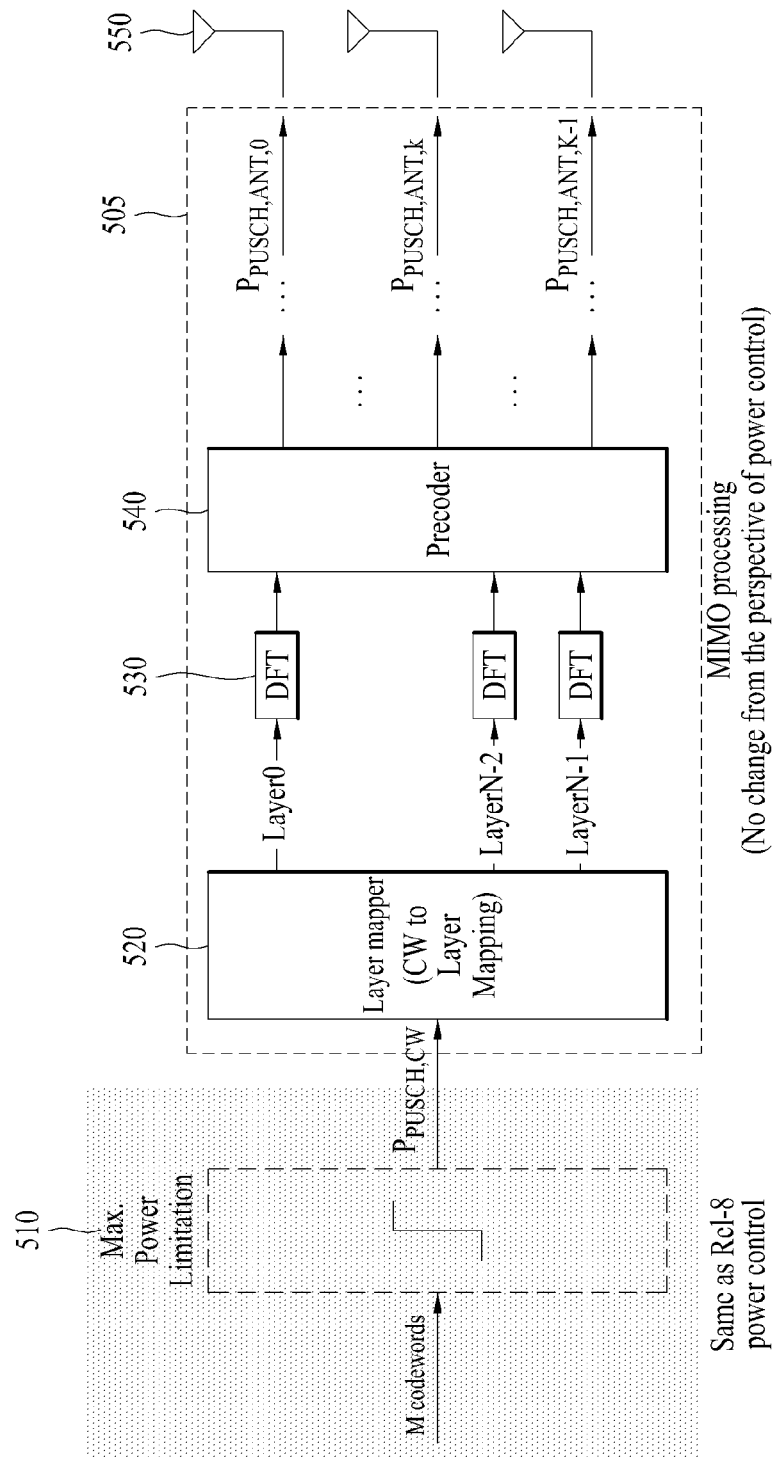
FIG. 5 is a diagram illustrating another example of a UL MIMO transmission chain of a 3GPP Release-10 system as an exemplary wireless communication system.

FIG. 5 is a diagram illustrating another example of a UL MIMO transmission chain of a 3GPP Release-10 system as an exemplary wireless communication system.

UL SU-MIMO transmission and related power control operations will now be described with reference to FIG. 5. As illustrated in FIG. 5, Tx powers allocated to codewords are the same and Tx powers across PAs are also the same. A maximum power control module 510 may limit a codeword power as in power control in 3GPP Release-8. Codewords passing through the maximum power control module 510 are mapped to layers by a layer mapper 520. The codewords mapped through the layer mapper 520 are Discrete Fourier transformed by a DFT module 530. A precoder 540 applies precoding to the discrete Fourier transformed codewords and then transmits the precoded codewords to antenna ports 550. As a result, in FIG. 5, a MIMO processing stage 505 undergoes no power variations in terms of power control. Such power control reduces signal overhead without increasing additional complexity.

The total sum of codeword powers depends upon the number of codewords. In association with FIG. 5, a UE Tx power for Physical Uplink Shared Channel (PUSCH) UL transmission in a subframe index i after operation of the maximum power control module 510 may be obtained by the following Equation 1:

$$P_{PUSCH,CW} = \min\{P_{CMAX} + \beta \cdot 10 \log 10(2), 10 \log 10(M_{PUSCH}(i)) + P_{O\_PUSCH}(j) + \alpha(j) \cdot PL + \Delta_{TF}(i) + f(i)\}$$ [Equation 1]

Here, $P_{CMAX}$ a maximum transmittable power of the UE and $\beta$ is a parameter ($\beta \in \{0,1\}$) for supporting different UE power configurations when an antenna turn-off vector is assigned. $M_{PUSCH}(i)$ is a parameter indicating the bandwidth of PUSCH resource assignment expressed as the number of resource blocks valid for a subframe index i and is allocated by the BS. $P_{O\_PUSCH}(j)$ is a parameter composed of the sum of a cell-specific nominal component $P_{O\_NOMINAL\_PUSCH}(j)$ provided from higher layers and a UE-specific component $P_{O\_UE\_PUSCH}(j)$ provided from higher layers and the BS informs the UE of $P_{O\_PUSCH}(j)$. $\alpha(j)$ is a cell-specific 3-bit parameter signaled by the BS from higher layers. For j=0 or 1, $\alpha \in \{0, 0.4, 0.5, 0.6, 0.7, 0.8, 0.9, 1\}$ and for j=2, $\alpha(j)=1$. The BS informs the UE of $\alpha(j)$. PL is a DL path loss (or signal loss) estimate calculated by the UE in dB and is expressed by $PL_c$=referenceSignalPower−higher layer filteredRSRP where referenceSignalPower may be provided by the BS to UE from higher layers.

f(i) is a value indicating a current PUSCH power control adjustment state for a subframe index i and may be denoted by a current absolute value or accumulation value.

$\Delta_{TF}(i)$ defined in a 3GPP LTE/LTE-A system is basically set to a value for one codeword. For a specific codeword index, if $K_S=1.25$, then $\Delta_{TF}(i)=10 \log_{10}((2^{MPR \cdot K_S}-1)\beta_{offset}^{PUSCH})$ and, if $K_S=0$, then $\Delta_{TF}(i)=0$ where Ks may be a UE-specific parameter deltaMCS-Enabled provided by the BS to the UE from higher layers. If $K_S=0$, then $\Delta_{TF}(i)=0$ and the Tx powers of codewords are the same. However, if $K_S=1.25$, the Tx powers of codewords may differ according to a transmission information size (or scheduled MCS level) normalized to an allocated resource of each codeword. Here, a parameter MPR (Maximum Power Reduction) may be referred to by other terms such as Bits Per Resource Element (BPRE). That is, if Ks is not 0, $\Delta_{TF}(i)$ may be generated based on the amount of information per resource element (e.g. BPRE) for each codeword.

During antenna turn-off according to an antenna configuration state of the UE, even if it is desired to use a maximum power rather than a saved power, whether the maximum power is supported is determined according to an antenna power configuration. For example, it is assumed that the first antenna of two Tx antennas has a PA/maximum power configuration of 20 dBm and the second antenna has a PA/maximum power configuration of 23 dBm. If a TPMI is configured to turn off the second antenna and to use only the first antenna, the UE will operate only in a power saving mode. On the contrary, if the first antenna is turned off, the UE may use a maximum power within the range of the maximum power thereof. The BS is aware of an antenna power class of each UE and informs the UE of a TPMI. The UE may operate in a power saving mode or a maximum power Tx mode according to whether the BS signals the mode. Contrarily, the UE may determine the mode without signaling of the BS.

Upon determining the parameter β in the above Equation 1, the UE may set the parameter β to 0 (OFF) or 1 (ON) according to a relationship between the antenna power configuration and the TPMI as described above so that an element of the above Equation 2 which performs operation with the parameter β may be enabled/disabled. Upon signaling the parameter β to the UE, the BS may include a 1-bit indicator in an existing LTE DCI format 0 or in a new format for SU-MIMO. Alternatively, β may be transmitted through a new format for sending independent information. In addition, β may be transmitted included in a signaling method transmitted by the BS to the UE.

The total Tx power of all antennas indicated in the above Equation 1 may be distributed with respect to each antenna as indicated in Equation 2:

$$P_{PUSCH,ANT,k}(i) = P_{PUSCH,CW}(i) + 10 \log_{10}(|w_{k,l}|^2)$$ [Equation 2]

Here, $w_{k,l}$ denotes an element of the k-th row and the l-th column of a precoding matrix including a precoding scaling factor and l denotes a layer index mapped to the k-th antenna. Some of $w_{k,l}$ may be set to 0 and, when an antenna turn-off vector is allocated, a Tx power of a corresponding antenna may be 0.

In addition to Equation 1, the following Equation 3 may be configured as an equation for the PUSCH UL Tx power in a subframe index i. Meanwhile, the detailed configuration method related to the above Equation 1 and Equation 2 may be identically applied to the following equation:

$$P_{PUSCH,CW}(i) = 10 \log 10(M_{PUSCH}(i)) + P_{0,PUSCH}(j) + \alpha(j) \cdot PL + \Delta_{TF}(i) + f(i) \quad \text{[Equation 3]}$$

The total Tx power of all antennas may be distributed with respect to each antenna port after passing through a MIMO block (precoder). A power at an antenna port k may be indicated by the following Equation 4:

$$P_{PUSCH,ANT,k}(i) = P_{PUSCH,CW}(i) + 10 \log_{10}(|w_{k,l}|^2) \quad \text{[Equation 4]}$$

Meanwhile, a total Tx power per carrier in a subframe index i may be given by:

$$P_{PUSCHc}(i) = \quad \text{[Equation 5]}$$
$$\min\left\{ P_{CMAXc} - \beta \cdot 10\log_{10}(2), \sum_{k=0}^{K-1} P_{PUSCH,ANT,k}(i) \right\}$$

In $\beta \cdot 10 \log_{10}(2)$ indicated in Equation 5, number '2' is an exemplary value and the value is not limited thereto. Other values may be used. The BS may inform the UE of the value or the UE may configure the value to be used thereby.

In addition to Equation 1 and Equation 3, an equation for the PUSCH UL Tx power in a subframe index i may be configured as indicated by the following Equation 6. Meanwhile, the detailed configuration method related to the above Equation 1 and Equation 2 may be identically applied to the following equation:

$$P_{PUSCH,CW}(i) = 10 \log 10(M_{PUSCH}(i)) + P_{0,PUSCH}(j) + \alpha(j) \cdot PL + \Delta_{TF}(i) + f(i) \quad \text{[Equation 6]}$$

The total Tx power of all antennas may be distributed with respect to each antenna port after passing through the MIMO block precoder 540 and a power at an antenna port k may be given by:

$$P_{PUSCH,ANT,k}(i) = P_{PUSCH,CW}(i) + 10 \log_{10}(|w_{k,l}|^2) + \beta \cdot 10 \log 10(S) \quad \text{[Equation 7]}$$

In the above Equation, S is an element for enabling a maximum Tx power. Although '2' is preferably used for S, other arbitrary values may be used. The BS may inform the UE of the value or the UE may configure the value to be used thereby. The total Tx power may be indicated as shown in Equation 8:

$$P_{PUSCHc}(i) = \min\left\{ P_{CMAXc}, \sum_{k=0}^{K-1} P_{PUSCH,ANT,k}(i) \right\} \quad \text{[Equation 5]}$$

In addition to Equation 1, Equation 2, and Equation 6, an equation for the PUSCH UL Tx power in a subframe index i may be configured as indicated by the following Equation 9.

Meanwhile, the detailed configuration method related to the above Equation 1 and Equation 2 may be identically applied to the following equation:

$$P_{PUSCH,CW}(i) = 10 \log 10(M_{PUSCH}(i)) + P_{0,PUSCH}(j) + \alpha(j) \cdot PL + \Delta_{TF}(i) + f(i) \quad \text{[Equation 9]}$$

The total Tx power of all antennas may be distributed with respect to each antenna port after passing through a MIMO block (precoder). A power in an antenna port k may be indicated by the following Equation 10:

$$P_{PUSCH,ANT,k}(i) = P_{PUSCH,CW}(i) + 10 \log_{10}(|w_{k,l}|^2) + \beta \cdot 10 \log 10(S) \quad \text{[Equation 10]}$$

Here, S is an element for enabling a maximum Tx power. Although '2' is preferably used for S, other arbitrary values may be used. The BS may inform the UE of the value or the UE may configure the value to be used thereby. The total Tx power of the UE may be indicated as shown in Equation 11:

$$P_{PUSCHc}(i) = \quad \text{[Equation 11]}$$
$$\min\left\{ P_{CMAXc} - \gamma \cdot 10\log 10(S\_1), \sum_{k=0}^{K-1} P_{PUSCH,ANT,k}(i) \right\}$$

In the above Equation 11, the case of an operation of a power saving mode, and the case of a power saving mode or a maximum power Tx mode may be considered when an antenna is turned off. In Equation 11, $\beta$ and $\gamma$ may be set as shown in Table 1.

TABLE 1

| | | β | γ |
|---|---|---|---|
| Non antenna Turn-off | | 0 | 0 |
| Antenna Turn-off | Power saving mode | 0 | 1 |
| | Maximum power Tx mode | 1 | 0 |

Referring to Table 1, when an antenna is not turned off (non antenna turn-off), both $\beta$ and $\gamma$ may be set to 0. Meanwhile, in the power saving mode when an antenna is turned off, $\beta$ may be set to 0 and $\gamma$ may be set to 1. In the maximum power Tx mode when an antenna is turned on, $\beta$ may be set to 1 and $\gamma$ may be set to 0. Although both S and S__1 in Equation 11 are preferably set to 2, the value may be arbitrarily set. In the maximum power Tx mode, the case where up to the allocation power of an unused antenna is used (this case is when the total power of the UE is equally distributed to all antennas of the UE) when an antenna is turned off and the case where the maximum power of the UE is used in consideration of a relationship between a PA configuration of an antenna and the total power of the UE may be considered.

The BS may signal the values of Table 1 to the UE or the UE may set and use the values of Table 1 as values known to the BS and the UE. Combinations excluding the values of Table 1 may be used. In addition, the BS may include the values of Table 1 in a DL control signaling message and transmit the DL control signaling message including the values of Table 1 to the UE. Alternatively, the values of Table 1 may be transmitted alone or may be included in an existing message and then transmitted.

In addition to Equation 1, Equation 3, Equation 6, and Equation 9, the following Equation 12 may be configured as an equation for the PUSCH UL Tx power in a subframe index i.

$$P_{PUSCH,CW}(i) = 10 \log 10(M_{PUSCH}(i)) + P_{0,PUSCH}(j) + \alpha(j) \cdot PL + \Delta_{TF}(i) + f(i) \quad \text{[Equation 12]}$$

As opposed to the above method, there is a power configuration method per antenna, to which antenna maximum power limit is applied. A power at each antenna port may be indicated by the following Equation 13:

$$P_{PUSCH,ANT,k}(i) = \min\{P_{CMAX,k} + \gamma \cdot 10 \log 10(S\_1),$$
$$P_{PUSCH,CW}(i) + 10 \log_{10}(|w_{k,l}|^2) + \beta \cdot 10 \log 10(S)\} \quad \text{[Equation 13]}$$

To set β and γ values of Equation 13, the contents of the above Equation 13 may be identically applied. In addition, the configuration method of detailed parameters may be identically applied.

As described above, $\Delta_{TF}(i)$ defined in a 3GPP LTE/LTE-A system is basically configured as a value for one codeword. If $K_S=1.25$ for a specific codeword index, then $\Delta_{TF}(i)=10 \log_{10}((2^{MPR \cdot K_S}-1)\beta_{offset}^{PUSCH})$ and, if $K_S=0$, then $\Delta_{TF}(i)=0$. In this case, Ks is a UE-specific parameter deltaMCS-Enabled provided by the BS to the UE from higher layers. MPR=$O_{CQI}/N_{RE}$ for control data transmitted through a PUSCH without Uplink Shared Channel (UL-SCH) data and $$MPR = \sum_{r=0}^{C-1} K_r / N_{RE}$$

for other cases. Here, C is the number of code blocks, $K_r$ is the size of a code block r, $O_{CQI}$ is the number of CQI bits including CRC bits, and $N_{RE}$ is the number of resource elements determined as $N_{RE}=M_{sc}^{PUSCH-initial} \cdot N_{symb}^{PUSCH-initial}$ where $N_{symb}^{PUSCH-initial}$ denotes the number of SC-FDMA symbols carrying a PUSCH in an initial PUSCH transmission subframe.

However, other methods are applicable. For example, when Ks=1.25, MPR may be defined as:

$$MPR = \frac{1}{Q} \cdot \sum_{m=0}^{Q-1} \sum_{r=0}^{C_m-1} K_r / N_{RE} \quad \text{[Equation 14]}$$

Here, Q is the total number of codewords. $K_r$ is the size of a code block and may be the same or different according to each codeword. If the sizes of code blocks are different with respect to codewords, the size of a code block size per codeword may be used. $N_{RE}$ basically uses one common value irrespective of the number of codewords. However, $N_{RE}$ may be configured in a different manner. Meanwhile, MPR (or BPRE) may be defined as indicated by the following Equation 15:

$$MPR = \frac{1}{Q} \cdot \sum_{m=0}^{Q-1} \sum_{r=0}^{C_m-1} K_{r,m} / N_{RE,m} \quad \text{[Equation 15]}$$

Here, Q may be 1, an arbitrary number, or the total number of codewords according to a method determined by the BS and the UE. In Equation 15, if Q is set to 1, MPR (or BPRE) is expressed by the sum of codewords. The MPR (or BPRE) value varies according to the Q setting method. For example, Q may be set using a sum or average value.

As opposed to the above method, a method of adding or averaging values of $\Delta_{TF}(i)$ for each codeword or using a maximum or minimum value thereof may be considered because a power may be allocated according to the size of $\Delta_{TF}(i)$ of each codeword.

As described above, 3GPP Rel-8 UL power control may be simply extended and applied to Rel-10 UL power control for SU-MIMO as illustrated in FIG. 5. Therefore, in transmission of two codewords, a Tx power of each codeword is maintained. In the case where a different MCS per codeword is permitted, if MCSs of two codewords are different, $K_s$ may be set to 0.

As opposed to the above method, a method of adding or averaging values of $\Delta_{TF}(i)$ for each codeword or using a maximum or minimum value thereof may be considered because a power may be allocated according to the size of $\Delta_{TF}(i)$ of each codeword.

For example, the following method may be used. When two codewords (CW=2) are present, a method for adding or averaging $\Delta_{TF}(i)$ values of the codewords may be used. In the following example, the method may be extended and applied according to an increase in the number of codewords (when the number of codewords exceeds 2). Equation 16 is an existing UL power control equation. When a system is extended to a multicarrier or CA system, a carrier index or a serving cell index may be added to each parameter of Equation 16:

$$P_{PUSCH}(i) = \min\{P_{CMAX}, 10 \log 10(M_{PUSCH}(i)) + P_{0,PUSCH}(j) + \alpha(j) \cdot PL + \Delta_{TF}(i) + f(i)\} \quad \text{[Equation 16]}$$

$\Delta_{TF}(i)$ applied in the above Equation 16 may be expressed as one of the following Equation 17 to Equation 21 or a combination thereof.

$$\Delta_{TF}(i) = \Delta_{TF\_CW0}(i) + \Delta_{TF\_CW1}(i) \quad \text{[Equation 17]}$$

In Equation 16, the sum of $\Delta_{TF}(i)$ of each codeword may be applied as a total value of $\Delta_{TF}(i)$. It is assumed in Equation 17 that two codewords are present.

Meanwhile, $\Delta_{TF}(i)$ applied in Equation 16 may be expressed by:

$$\Delta_{TF}(i) = 10 * \log_{10}(((2^{MPR_{CW0} * Ks_{CW0}} - 1) * \beta_{offset\_CW0}^{PUSCH}) + ((2^{MPR_{CW1} * Ks_{CW1}} - 1) * \beta_{offset\_CW1}^{PUSCH})) \quad \text{[Equation 18]}$$

Here, MPR (or BPRE), $\beta_{offset}^{PUSCH}$, and Ks are values applied with respect to each codeword.

In addition, $\Delta_{TF}(i)$ applied to Equation 16 may be given by:

$$\Delta_{TF}(i) = \left( \frac{\Delta_{TF\_CW0}(i) + \Delta_{TF\_CW1}(i)}{\text{Total number of } CWs} \right) \quad \text{[Equation 19]}$$

Equation 19 indicates an average value obtained by dividing a value corresponding to Equation 17 by the total number of codewords.

Furthermore, $\Delta_{TF}(i)$ applied to Equation 16 may be indicated by the following Equation 20:

$$\Delta_{TF}(i) = 10 * \log_{10}\left\{ \frac{((2^{MPR_{CW0} * Ks_{CW0}} - 1) * \beta_{offset\_CW0}^{PUSCH}) + ((2^{MPR_{CW1} * Ks_{CW1}} - 1) * \beta_{offset\_CW1}^{PUSCH})}{\text{Total number of } CWs} \right\} \quad \text{[Equation 20]}$$

$\Delta_{TF}(i)$ applied to Equation 16 may also be given by the following Equation 21:

$$\Delta_{TF}(i) = \frac{10 * \log_{10}\left(\begin{pmatrix}\frac{(2^{MPR_{CW0}*Ks_{CW0}} - 1)*}{\beta^{PUSCH}_{offset\_CW0}}\\ \frac{(2^{MPR_{CW1}*Ks_{CW1}} - 1)*}{\beta^{PUSCH}_{offset\_CW1}}\end{pmatrix}\right)}{\text{Total number of } CWs} \quad \text{[Equation 21]}$$

As mentioned previously, the UE receives Ks as a UE-specific parameter 'deltaMCS-Enabled' through higher-layer signaling and 0 or 1.25 is applied as the Ks value. However, this is an applied scheme when a single Tx antenna and a single codeword are used. Accordingly, when multiple antennas and/or multiple codewords are used, another form of support from the conventional method is needed. In this case, Ks may be a value excluding 0 and 1.25.

In the above Equation 17 to 21, the UE may receive the parameter 'deltaMCS-Enabled' including the Tx power control indication value Ks related to an MCS level to be applied to a plurality of codewords. Then, the processor 250 of the UE may determine a UL Tx power for transmission of multiple codewords using the Tx power control value Ks. If the Tx power control indication value Ks is 0, $\Delta_{TF}(i)$ becomes 0. Otherwise, if Ks is not 0, the processor 250 of the UE may calculate $\Delta_{TF}(i)$ based on the amount of corresponding information (e.g. BPRE) per unit resource of each codeword. For example, the amount of corresponding information per unit resource of each codeword may be different. The UL Tx power for transmission of multiple codewords may be determined through a Physical Uplink Shared Channel (PUSCH) using the calculated Tx power control parameter $\Delta_{TF}(i)$.

According to data transmission methods and various transmission scenarios of the UE, various forms of Ks may be used. Accordingly, the following method may be considered.

The BS may inform the UE of Ks of the UE as configuration information through higher-layer signaling. In this case, Ks may be applied instead of higher-layer signaling called deltaMCS-Enabled. That is, if the value of Ks is signaled from higher layers, higher-layer signaling of deltaMCS-Enabled may not be necessary. As another method, higher-layer signaling of deltaMCS-Enabled and, at the same time, Ks may be transmitted to the UE through higher-layer signaling. This method preferably maintains compatibility with legacy systems (LTE Rel. 8/9).

Meanwhile, Ks may be transmitted to the UE through a grant message type, for example, DL grant/UL grant. In the case where the data transmission method and transmission scenario of the UE are dynamically changed, the BS may preferably transmits Ks through the grant message type. This case includes the case where the data transmission method and transmission scenario are less frequently changed than higher-layer signaling.

The above-mentioned MPR may be referred to as BPRE and the invention related to $\Delta_{TF}(i)$ is applicable to the case where Ks is enabled (Ks is non-zero). The various UL power control equations which have been described up to now may be, but are not limited to, UL power control equations in a serving cell through which the UE transmits/receives signals.

According to the above-described various UL power control equations, power control of the UE using multiple antennas is easy and simple.

The embodiments described above are combinations of elements and features of the present invention in a predetermined form. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious that claims that do not explicitly cite each other in the appended claims may be presented in combination as an exemplary embodiment of the present invention or included as a new claim by subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description and all changes coming within the meaning and equivalency range of the appended claims are intended to be embraced therein.

INDUSTRIAL APPLICABILITY

A method and an apparatus for a UE to control a UL Tx power for transmission of multiple codewords in a wireless communication system supporting a plurality of antennas are applicable to various mobile communication systems such as 3GPP LTE, LTE-A, etc.

The invention claimed is:

1. A method for controlling an uplink transmission power for transmission of multiple codewords at a user equipment in a wireless communication system supporting multiple antennas, the method comprising:
   receiving a first transmission power control parameter including a first transmission power control indication value related to uplink transmission power control from a base station; and
   determining a second transmission power control parameter for transmission of the multiple codewords based on the first transmission power control indication value; and
   calculating the uplink transmission power for transmission of the multiple codewords based on the second transmission power control parameter,
   wherein the first transmission power control indication value is a value corresponding to each of the multiple codewords, and
   wherein the second transmission power control parameter is expressed by $\Delta_{TF}(i)$ of equation A, $$\Delta_{TF}(i) = (\Delta_{TF}\_CW_0(i) + \ldots \Delta_{TF}\_CW_{n-1}(i))/\text{Total number of } CWs(n)$$

$$\Delta_{TF}\_CW_{n-1}(i) = 10 \log_{10}((2^{MPR_{CW_{n-1}} \cdot Ks\_CW_{n-1}} - 1) \cdot \beta^{PUSCH}_{offset\_{n-1}}) \quad \text{[equation A]}$$

where:
   i denotes a subframe index,
   MPR is a maximum power reduction, and
   $Ks\_cw_{n-1}$ is the first transmission power control indication value for a codeword (CW) having an index n−1.

2. The method according to claim 1, wherein the uplink transmission power for transmission of the multiple codewords is transmission power of a Physical Uplink Shared Channel (PUSCH).

3. The method according to claim 1, wherein the first power control parameter is a parameter 'deltaMCS-Enabled' received through higher-layer signaling.

4. The method according to claim 1, wherein the first power control parameter is received through a downlink grant or an uplink grant.

5. A user equipment for controlling an uplink transmission power for transmission of multiple codewords in a wireless communication system supporting multiple antennas, comprising:

a receiver configured to receive a first transmission power control parameter including a first transmission power control indication value related to uplink transmission power control from a base station; and a processor configured to:
determine a second transmission power control parameter for transmission of the multiple codewords based on the first transmission power control indication value; and
calculate the uplink transmission power for transmission of the multiple codewords based on the second transmission power control parameter, wherein the first transmission power control indication value is a value corresponding to each of the multiple codewords, wherein the second transmission power control parameter is expressed by $\Delta_{TF}(i)$ of equation A, $$\Delta_{TF}(i) = (\Delta_{TF}\text{-}CW_0(i) + \ldots \Delta_{TF}\text{-}CW_{n-1}(i))/\text{Total number of }CWs(n)$$

$$\Delta_{TF}\text{-}CW_{n-1}(i) = 10 \log_{10}((2^{MPR_{CW_{n-1}} \cdot K_{s\text{-}CW_{n-1}}} - 1) \cdot \beta_{offset\_-1}^{PUSCH}) \quad \text{[equation A]}$$

where:
i denotes a subframe index,
MPR is a maximum power reduction, and
$Ks\_cw_{n-1}$ is the first transmission power control indication value for a codeword (CW) having an index n−1.

6. The user equipment according to claim 5, wherein the uplink transmission power for transmission of the multiple codewords is a transmission power of a Physical Uplink Shared Channel (PUSCH).

7. The user equipment according to claim 5, wherein the first power control parameter is a parameter 'deltaMCS-Enabled' received through higher-layer signaling.

8. The user equipment according to claim 5, wherein the first power control parameter is received through a downlink grant or an uplink grant.

* * * * *